United States Patent [19]

Blaskowski

[11] 4,360,339
[45] Nov. 23, 1982

[54] FLUIDIZED BOILER
[75] Inventor: Henry J. Blaskowski, Avon, Conn.
[73] Assignee: Combustion Engineering, Inc., Windsor, Conn.
[21] Appl. No.: 230,216
[22] Filed: Feb. 2, 1981
[51] Int. Cl.³ .................. F27B 15/00; F23D 13/18
[52] U.S. Cl. .................... 432/58; 110/244; 110/245; 122/4 D; 122/367 PF; 431/170; 165/104.16
[58] Field of Search ............ 110/244, 245; 122/4 D, 122/367 PF; 165/104.16; 432/15, 58; 206/584; 431/170

[56] References Cited
U.S. PATENT DOCUMENTS

| | | | |
|---|---|---|---|
| 2,048,446 | 7/1936 | Hays | 122/367 PF |
| 2,082,338 | 6/1937 | Hays | 122/367 PF |
| 2,121,733 | 6/1938 | Cottrell | 122/4 |
| 2,835,483 | 5/1958 | Lindsay | 122/4 |
| 2,997,031 | 8/1961 | Ulmer | 122/4 |
| 3,877,441 | 4/1975 | Mach et al. | 122/367 PF |
| 3,898,043 | 8/1975 | Schutte et al. | 165/104.16 |
| 3,921,712 | 11/1975 | Renzi | 122/367 PF |
| 4,054,376 | 10/1977 | Wareham | 165/104.16 |
| 4,176,623 | 12/1979 | Blaskowski | 110/244 |
| 4,269,895 | 5/1981 | Borchert et al. | 206/584 |

Primary Examiner—Henry C. Yuen
Attorney, Agent, or Firm—William W. Habelt

[57] ABSTRACT

A fluidized bed call (10) having a static ignition bed (18) of inert heat storage particles (50) disposed immediately beneath and adjacent to a fluidizing region (44) wherein fuel particles are combusted, characterized in that the heat storage particles (50) are generally spherical in shape, each particle having a plurality of protuberances (52) extending outwardly from the surface of the particle a preselected length thereby maintaining a minimum spacing, equal to the preselected length of the protuberances, between neighboring spherical particles within the static ignition bed thereby ensuring that sufficient void space (54) exists within the static ignition bed for the fluidizing air to flow upward through the static ignition bed into the fluidizing region without an excessive pressure drop and for the fuel particles to laterally penetrate the static ignition bed.

2 Claims, 3 Drawing Figures

FLUIDIZED BOILER

BACKGROUND OF THE INVENTION

The present invention relates to fluidized bed reactors in general and, more particularly, to a novel physical form for the inert heat storage particles of a fluidized bed of the type wherein a bed of fluidized fuel particles is established above and immediately adjacent to a static bed of inert heat storage particles.

Fluidized bed reactors made up of a single fluidized bed cell or a plurality of individual fluidized bed cells are well-known in the prior art. In such reactors, fuel particles are burned while maintained in a fluidized state most typically by the air supplied for combustion of the fuel particles. One advantage of burning fuel in a fluidized state lies in the ability of the bed of fluidized fuel particles to burn in a comparatively small volume, to conduct heat relatively rapidly to heating surfaces immersed within the fluidized particles, and to absorb sulfur in the fuel if the fluidized bed includes particles of a sulfur absorbent material as well as fuel particles.

The relatively rapid conduction of the heat of the fluidized bed to the heating surfaces immersed therein results from the high thermal conductivity that characterizes the fluidized mass of particles in the bed. Unfortunately, the high conductivity of the bed in the fluid state makes stable operation at low firing rates difficult. A small imbalance between the rate of heat liberation and the rate of heat removal can cause the bed temperature to fall by a relatively large amount. Such an imbalance, caused, by instance, by a mementary reduction in the fuel supply rate, can cause the bed temperature to fall below the ignition temperature of the fuel, particularly when operating at low loads since the bed temperature is then already relatively low. Since the ignition of the fuel particles in a fluidized bed cell is dependent predominately upon the temperature of the fluidized bed, the almost unavoidable heat flow imbalances in the system can cause the bed to become extinguished at low loads.

One solution to the aforementioned problem, as disclosed in U.S. Pat. No. 4,176,623, envisions a fluidized bed cell comprised of a bed of fluidized fuel particles positioned above and immediately adjacent to a static bed of inert heat storage particles. Fuel particles are fed to the static bed and ignited by the heat retained in the inert heat storage particles of the static bed. A supply of fluidizing combustion air is blown upwardly through the static bed into the fluidizing region in such a manner as to carry the fuel particles from the static bed into the fluidizing region and to fluidize the fuel particles within the fluidizing region while not fluidizing the inert heat storage particles forming the static bed.

One major problem associated with a fluidized bed employing a static ignition bed of heat storage particles as contemplated in U.S. Pat. No. 4,176,623, is the problem of maintaining sufficient void space between the inert heat storage particles of the static ignition. If sufficient void space is not present, the pressure drop encountered by the fluidizing air in traversing the bed may become excessive and result in the velocity of the air passing therethrough dropping below the minimum velocity necessary to ensure fluidization of the fuel particles within the fluidized bed above the static ignition bed. Additionally, an excessive pressure drop within the static ignition bed results in increased fan power requirements for the forced draft fans supplying fluidizing combustion air to the fluidized bed.

Additionally, if sufficient void space is not present, fuel particles injected into the bed from a central feed point will not be able to migrate across the bed. Therefore, good lateral fuel distribution, which is essential for efficient operation of the fluidized bed, will not be attained.

SUMMARY OF THE INVENTION

The present invention, therefore, provides a fluidized bed cell wherein the static ignition bed contains sufficient void space to ensure that an excessive pressure drop is not encountered and that good lateral fuel distribution is attained.

According to the present invention, a fluidized bed cell comprised of a fluidized bed of fuel particles positioned above and immediately adjacent to a static bed of inert heat storage particles is characterized in that the inert heat storage particles are generally spherical in shape with each of the particles having a plurality of protuberances extending outwardly from its surface for a preselected length. In this manner, neighboring spherical heat storage particles are maintained apart a minimum distance equal to the preselected length for which the protuberances extend outwardly from the surface of the particles. This ensures that sufficient void space exists within the static ignition bed for the fluidizing air to flow upwardly therethrough into the fluidizing bed without encountering an excessive pressure drop and that good lateral fuel distribution will be attained.

In a preferred embodiment of the present invention, each of the generally spherical inert heat storage particles have six protuberances extending outwardly from its furface for a uniform preselected length, each protuberance spaced at a 90° spherical angle from its neighboring protuberances.

BRIEF DESCRIPTION OF THE DRAWINGS

The features and advantages of the present invention will be described in greater detail with reference to the attached drawing, in which.

DETAILED DESCRIPTION OF THE PREFERRED EMBODIMENT

Figure 1:
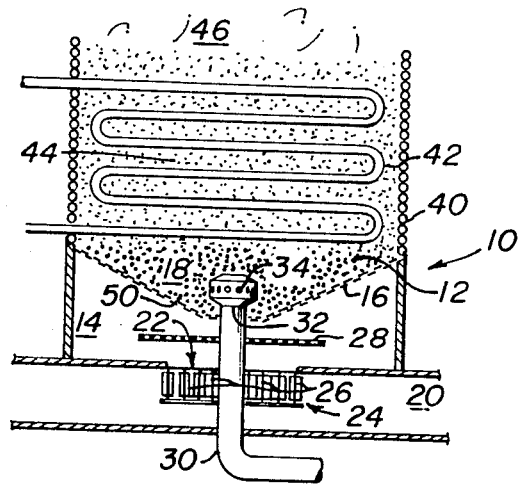
FIG. 1 is a partly sectional vertical elevation view of a fluidized bed cell constructed according to the teachings of the present invention.

Referring to the drawing, and more particularly to FIG. 1 thereof, there is illustrated therein a fluidized bed combustion cell designed in accordance with the present invention. The fluidized bed combustion cell 10 shown in FIG. 1 could in principle be the entire combustion zone of a fluidized bed boiler or it could nearly be a single combustion cell in a multi-cell boiler.

The fluidized bed boiler 10 is formed of a combustion zone 12 bounded on its sides by horizontal waterwalls 40 and an air inlet plenum 14 disposed in the lower portion of the fluidized bed boiler 10 beneath the combustion zone 12. A static bed support plate 16 is positioned between the air plenum 14 and the combustion zone 12 of the fluidized bed boiler 10 and extends across the entire area of the fluidized bed cell to separate the combustion region 12 from the air plenum 14. The static bed support plate 16 is somewhat dish-shaped, being deeper in the center than on the sides, and has appropriate openings for allowing fluidizing and combustion air to pass upwardly through it.

Supported by and disposed within the cavity formed by the dish-shaped bed support plate 16 is a static ignition bed 18 of inert heat storage particles 50. The openings in the static bed support plate 16 for allowing fluidizing and combustion air to pass upwardly from the air plenum 14 into the combustion zone 12 of the fluidized bed cell 10 are appropriately sized to prevent the heat storage particles 50 from passing therethrough.

Immediately above and adjacent to the static bed 18 is a fluidizing region 44, which is shown in the drawings as being occupied by a fluidized mass of fuel particles. This suggests the normal operation of the bed in which the fluidization creates a quasi-liquid mass of fuel particles having a more or a less definite upper boundary above which the so-called freeboard region 46 extends. The freeboard region, whose purpose is to provide a region in which particles thrown upward from the bed by the mixing action generated by the fluidizing air passing therethrough can execute a complete trajectory and fall back into the fluidizing region 44 without being drawn out with the exhaust gases. Immersed within the fluidizing region 44 is a heat transfer coil 42 through which a liquid, typically water, is passed in heat exchange relationship with the fluidized fuel particles being combusted in the fluidizing region 44 of the fluidized bed cell 10.

Fluidizing air, which also serves as combustion air, is supplied to the fluidized bed cell 10 through windbox 20 disposed beneath the floor of the fluidized bed cell 10. The air passing through the windbox 20 enters air plenum 14 through an opening 22 in the floor of the fluidized bed boiler 10. A damper 24, whose purpose is to regulate the flow of air from the windbox 20 through the opening 22, is positioned in the opening 22. The damper 24 includes vanes or blades 26 that are adjustable for controlling the amount of air admitted to the air plenum 14 from the windbox 20 through the opening 22 in the floor of the fluidized bed cell 10. The combustion air collected in the air plenum 14 then passes upwardly through the bed support plate 16 into the combustion region 12 to fluidize the fuel particles being combusted therein. A baffle plate 28 is disposed within the air plenum 14 above the opening 22 in the floor of the fluidized bed cell 10 to properly distribute the air entering through the opening 22 in the floor of the fluidized bed cell 10.

A coal pipe 30 extends vertically upward, penetrating the windbox 20, and passing through the air plenum 14 and the bed support plate 16 to extend into the static bed 18, terminating in a fuel distributor 32. Fuel, typically coal, is injected laterally outwardly into the static bed 18 of inert heat storage particles 50 through holes 34 disposed circumferentially in the wall of the fuel distributor 32. Additionally, the fuel distributor 32 houses an igniter for igniting the fuels being fed to the fluidized bed cell 10 during start-up and warm-up. The combustion air collecting in the air plenum 14 passes upwardly through the bed support plate 16 to carry the fuel particles being fed into the static ignition bed 18 upwardly therefrom into the fluidized region 44 and to maintain th fuel particles carried into the fluidizing region 44 in a fluidized state while they are being combusted therein. the velocity of the fluidizing air is controlled so that the fuel particles are fluidized, but the inert heat storage particles 50 of the static ignition bed 18 remain stationary in a non-fluidized state.

Operation of the fluidized bed cell 10 is initiated by feeding igniter fuel into the static ignition bed 18 through fuel pipe 30 and fuel distributor 32. Igniter fuel is lit upon entering the static ignition bed 18 by appropriate igniter means, not shown in the drawings, and the resulting combustion of the igniter fuel begins to heat the heat storage particles 50 in the static bed 18. After the static bed has reached a temperature that is high enough to support ignition of the main fuel such as coal, the coal feed is initiated through the fuel pipe 30 and the fuel distributor 32 into the static ignition bed 18. As the coal leaves the fuel distributor 32, it is ignited by the flame produced by the igniter fuel if the igniter fuel is still being fed to the bed, or by the heat stored in the heat storage particles 50 of the static ignition bed 18.

The coal feed is gradually increased to full capacity; and since the combustion is self-sustaining, the flow of igniter fuel is discontinued. As the coal feed is increased, the air flow rate is also increased until a design air flow velocity is reached, that velocity being at some point above the fluidization velocity inert heat storage particles 50 of the static ignition bed 18. Much of the coal fed to the static ignition bed 18 is blown into the fluidizing region 44 and combusted therein in a fluidized state. Steady state operation is maintained at a bed temperature of around 1500 to 1700 F through control of the coal feed rate and the fluidizing air flow rate to the fluidized bed cell 10.

During this mode of operation, a small imbalance between the heat liberalization from the coal being burned and the fluidizing region 44 and the heat absorption therefrom by the waterwalls 40 and the immersed heat exchange tubes 42 can cause a significant change in bed temperature. As the firing rate is lowered in response to changes in load, the normal temperature in the fluidizing bed region 44 is reduced. Therefore, a significant temperature drop could well result in the temperature in the fluidized bed region 44 that is below the ignition point of the fuel. It is under such conditions that the advantages of the static ignition bed become apparent.

The low thermal conductivity of the inert heat storage particles 50 of the static ignition bed 18 enable the temperature of the static ignition bed 18 to remain above that required for ignition of the fuel even though the temperature of the fluidized bed region 44 has dropped below the ignition point. As a result, the fuel flowing to the fluidized bed region 44 is ignited upon entrance into the static ignition bed 18. The heat liberated upon ignition of the fuel as it enters the static bed 18 helps maintain the temperature of the static ignition bed so that operation of the fluidized bed cell 10 may continue.

As mentioned hereinbefore, it is necessary to maintain sufficient void space between the inert heat storage particles 50 within the static ignition bed 18 to ensure that the fluidizing air does not experience an excessive pressure drop in traversing bed 18 and that good lateral fuel penetration across bed 18 is attained. If the heat storage particles 50 become too closely packed, there is insufficient void space for the fluidizing air to freely pass through as it traverses the static ignition bed 18 resulting in an unacceptably high pressure drop. Further, coal particles injected laterally outward into the static bed 18 will be unable to migrate laterally across the bed 18 but rather will tend to concentrate in the vicinity of the central bed point.

Figure 2:
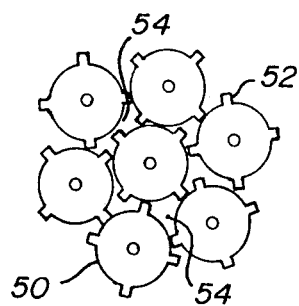
FIG. 2 is a detailed close-up view of the preferred embodiment of the heat storage particles of the static ignition bed 18 of FIG. 1.
Figure 3:
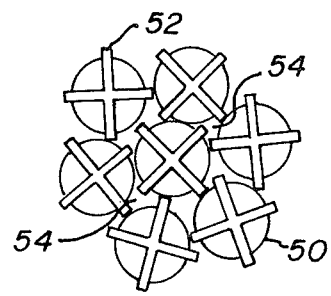
FIG. 3 is a detailed close-up view of an alternate embodiment of the heat storage particles of the static ignition bed 18 of FIG. 1.

In accordance with the present invention, a fluidized bed cell of the type herein described before is characterized in that the inert heat storage particles 50 are generally spherical in shape with each of the particles having a plurality of protuberances 52 extending outwardly from its surface for a preselected length. As shown in FIGS. 2 and 3, the protuberances 52 extending outwardly from the generally spherical heat storage particles 50 prevent the heat storage particles 50 of the static ignition bed 18 from becoming closely compacted together and ensure that sufficient void space 54 is maintained between neighboring heat storage particles.

As shown in FIG. 2, the protuberances extending outwardly from the generally spherical heat storage particles 50 may comprise six cylindrical knobs extending outwardly for a uniform preselected length, each protuberance spaced at a 90 degree spherical angle from its neighboring protuberances. Although the individual protuberances 52 shown in FIG. 2 in their preferred form as cylindrical knob-like protuberances, it is within the contemplation of the present invention that the individual protuberances may be in the form of conical knobs or rectangular knobs or hemispherical knobs or other right prismatic knobs.

An alternate embodiment of the protuberances 52 extending outwardly from the generally spherical heat storage particles 50 is shown in FIG. 3. As shown therein, the protuberances are in the form of two circumferential ridges 52 extending outwardly from the surface of the heat storage particles 50 for a uniform preselected length. The circumferential ridges 52 are preferably disposed perpendicularly with respect to each other. Although the circumferential ridges 52 shown in FIG. 3 are rectangular in cross section, it is within the contemplation of the present invention the the circumferential ridges may have a cross-sectional form of a semicircle or a traingle.

The protuberances 52, no matter what their shape, serve to maintain a spacing between neighboring heat storage particles 50 so that sufficient void space 54 is provided between neighboring heat storage particles 50. This void spaces 54 provides volume through which the fluidizing air may pass through and the coal particles laterally penetrate the static ignition bed 18.

By varying the preselected length of the protuberances 52 outwardly from the surface of the heat storage particles 50, the amount of void spaces 54 provided between neighboring particles; and, therefore, the pressure drop through and the fuel distribution across bed 18, may be optimized.

While only two embodiments of the present invention have been shown, it would be appreciated that modifications thereof, some of which have been alluded to hereinabove, may readily be made thereto by those skilled in the art. Therefore, it is intended by the appended claims to cover the modifications alluded to herein as well as all other modifications which fall within the true spirit and scope of the present invention

I claim:

1. A fluidized-bed cell of the type including a static ignition be of inert heat-storage particles, a fluidizing region disposed above and immediately adjacent to the static ignition bed, means for feeding fuel particles into the static ignition bed, means for igniting the fuel particles fed to the static ignition bed, and means for blowing air upwardly through the static bed so as to carry the fuel particles into the fluidizing region and fluidize the fuel particles within the fluidizing region but not fluidize the inert heat-storage particles forming the static ignition bed, characterized in that the inert heat-storage particles are generally spherical in shape with each of said particles having a plurality of protuberances extending outwardly from its surface for a preselected length, and each of said generally spherical heat-storage particles has six cylindrical knob-like protuberances extending outwardly from its surface for a uniform preselected length, each protuberance spaced at a 90 degree spherical angle from its neighboring protuberances.

2. A fluidized-bed cell of the type including a static ignition bed of inert heat-storage particles, a fluidizing region disposed above and immediately adjacent to the static ignition bed, means for feeding fuel particles into the static ignition bed, means for igniting the fuel particles fed to the static ignition bed, and means for blowing air upwardly through the static bed so as to carry the fuel particles into the fluidizing region and fluidize the fuel particles within the fluidizing region but not fluidize the inert heat-storage particles forming the static ignition bed, characterized in that the inert heat-storage particles are generally spherical in shape with each of said particles having a plurality of protuberances extending outwardly from its surface for a preselected length, and each of said generally spherical heat-storage particles has two circumferential ridges extending outwardly from its surface for a uniform preselected length, said circumferential ridges being disposed perpendicularly with respect to each other.

* * * * *

UNITED STATES PATENT AND TRADEMARK OFFICE
CERTIFICATE OF CORRECTION

PATENT NO. : 4,360,339
DATED : November 23, 1982
INVENTOR(S) : Henry J. Blaskowski It is certified that error appears in the above—identified patent and that said Letters Patent is hereby corrected as shown below:

IN THE ABSTRACT

Line 1, change "call" to --cell--

Column 1, line 32 after "caused," change "by" to --for--
    line 32 change "mementary" to --momentary--

Column 2, line 35 change "furface" to --surface--

Column 3, line 66 change "th" to --the--

Column 4, line 25 after "velocity" insert --for the fuel particles but below the fluidization velocity for the--

Column 5, line 39 after invention, change "the" to --that--
    line 41 change "traingle" to --triangle--

Column 6, line 14 change "be" to --bed--

Signed and Sealed this

Fifth Day of April 1983

[SEAL]

Attest:

GERALD J. MOSSINGHOFF

Attesting Officer     Commissioner of Patents and Trademarks